(12) United States Patent
Ikeno et al.

(10) Patent No.: US 10,975,191 B2
(45) Date of Patent: Apr. 13, 2021

(54) URETHANE (METH)ACRYLATE, METHOD FOR MANUFACTURING URETHANE (METH)ACRYLATE, CURABLE COMPOSITION, CURED ARTICLE, AND METHOD FOR MANUFACTURING CURED ARTICLE

(71) Applicant: MITSUBISHI GAS CHEMICAL COMPANY, INC., Chiyoda-ku (JP)

(72) Inventors: Taketo Ikeno, Niigata (JP); Umi Yokobori, Niigata (JP); Hideyuki Sato, Niigata (JP); Ryuji Hasemi, Niigata (JP)

(73) Assignee: MITSUBISHI GAS CHEMICAL COMPANY, INC., Chiyoda-ku (JP)

( * ) Notice: Subject to any disclaimer, the term of this patent is extended or adjusted under 35 U.S.C. 154(b) by 119 days.

(21) Appl. No.: 16/305,472

(22) PCT Filed: May 25, 2017

(86) PCT No.: PCT/JP2017/019515
§ 371 (c)(1),
(2) Date: Nov. 29, 2018

(87) PCT Pub. No.: WO2017/208959
PCT Pub. Date: Dec. 7, 2017

(65) Prior Publication Data
US 2020/0123303 A1   Apr. 23, 2020

(30) Foreign Application Priority Data
Jun. 1, 2016 (JP) ................. 2016-109813

(51) Int. Cl.
| C08G 18/44 | (2006.01) |
| C08G 18/67 | (2006.01) |
| C08G 18/24 | (2006.01) |
| C08G 18/28 | (2006.01) |
| C08G 18/73 | (2006.01) |
| C08G 18/76 | (2006.01) |

(52) U.S. Cl.
CPC ....... *C08G 18/6755* (2013.01); *C08G 18/246* (2013.01); *C08G 18/2835* (2013.01); *C08G 18/44* (2013.01); *C08G 18/735* (2013.01); *C08G 18/7614* (2013.01)

(58) Field of Classification Search
CPC ............. C08G 18/6755; C08G 18/246; C08G 18/2835; C08G 18/44; C08G 18/735; C08G 18/7614; C08G 18/73; C08G 18/7621; C08G 18/10; C08F 290/06
See application file for complete search history.

(56) References Cited

U.S. PATENT DOCUMENTS

| 5,276,068 A | 1/1994 | Waknine |
| 5,444,104 A | 8/1995 | Waknine |
| 6,440,519 B1 | 8/2002 | Takase et al. |
| 2017/0145158 A1 | 5/2017 | Hayashi et al. |
| 2017/0158855 A1 | 6/2017 | Yokobori et al. |

FOREIGN PATENT DOCUMENTS

| JP | S62-226907 | 10/1987 |
| JP | H10-287718 A | 10/1998 |
| JP | 2009-215452 | 9/2009 |
| JP | 2012-67259 A | 4/2012 |
| JP | 2012-184385 A | 9/2012 |
| JP | 2014-77069 A | 5/2014 |
| JP | 2014-189572 A | 10/2014 |
| WO | WO 2016/002873 A1 | 1/2016 |
| WO | WO 2016/002910 A1 | 1/2016 |

OTHER PUBLICATIONS

Extended European Search Report dated Jun. 6, 2019 in Patent Application No. 17806516.5, 7 pages.
International Preliminary Report on Patentability and Written Opinion dated Dec. 4, 2018 in PCT/JP2017/019515 with English translation, 9 pages.
International Search Report dated Aug. 22, 2017 in PCT/JP2017/019515.

*Primary Examiner* — Sanza L. McClendon
(74) *Attorney, Agent, or Firm* — Oblon, McClelland, Maier & Neustadt, L.L.P.

(57) ABSTRACT

Provided is a urethane (meth)acrylate capable of achieving high strength and high elongation, as well as a method for manufacturing a urethane (meth)acrylate, a curable composition, a cured article, and a method for manufacturing a cured article. The urethane (meth)acrylate contains a structural unit derived from polycarbonate diol, a structural unit derived from polyisocyanate, and a hydroxy group-containing (meth)acrylate-derived group, the polycarbonate diol containing one or more types of structural unit represented by formula (1) wherein each of $R^1$, $R^2$, $R^3$ and $R^4$ independently represents an aliphatic hydrocarbon group having 1 to 6 carbon atoms.

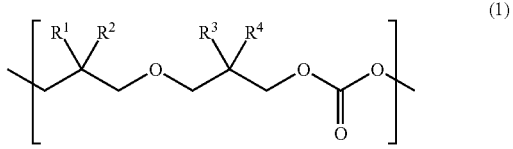

(1)

20 Claims, No Drawings

URETHANE (METH)ACRYLATE, METHOD FOR MANUFACTURING URETHANE (METH)ACRYLATE, CURABLE COMPOSITION, CURED ARTICLE, AND METHOD FOR MANUFACTURING CURED ARTICLE

TECHNICAL FIELD

This invention relates to a urethane (meth)acrylate, a method for manufacturing a urethane (meth)acrylate, a curable composition, a cured article, and a method for manufacturing a cured article; and in particular to a urethane (meth)acrylate synthesized from a polycarbonate diol, a polyisocyanate and a hydroxy group-containing (meth)acrylate, a method for manufacturing the same, as well as a curable composition that contains the urethane (meth)acrylate.

BACKGROUND ART

Curable compositions which are curable under irradiation with active energy ray or the like are environment-friendly since they can be prepared without using solvents. Cured articles obtainable by irradiation with active energy ray or the like excel in elasticity and adhesiveness, and have widely been used as optical component, electric or electronic component, interior and exterior parts of aircraft or automobile, paint or coating material for exterior wall or floor of housing, sealant, and adhesive.

Conventionally, urethane (meth)acrylate oligomers synthesized from inexpensive polyester diol or polyether diol have widely been used for the aforementioned applications. In recent years, there is however an increasing tendency of using urethane (meth)acrylate oligomers having a polycarbonate diol skeleton. One possible reason ever known is that a cured article, cured by irradiating active energy ray on the urethane (meth)acrylate having a polyether diol skeleton, has poor heat resistance and poor weather resistance, due to ether bonds contained therein. Meanwhile, a cured article having a polyester diol skeleton has been known to have improved heat resistance, but still has insufficient hydrolysis resistance due to ester bonds contained therein. Hence the cured article having a polycarbonate diol skeleton is suitable for applications where higher levels of heat resistance, weather resistance and hydrolysis resistance are required (Patent Literature 1).

In most cases, a radical polymerizable oligomer is used in combination with a radical polymerizable monomer, and also with a photoradical polymerization initiator, and further with other additives (Patent Literature 2). The radical polymerizable oligomer has two or more vinyl polymerizable functional groups at the terminal thereof, wherein the flexibility and elongation are modifiable to some extent by changing the type of skeleton to be introduced into the principal chain, or the molecular weight of the principal chain. A trade-off relation has widely been known, such that a pursuit of strength lowers the elongation, and an effort for increasing elongation lowers the strength (Patent Literature 3)

Meanwhile, as the polycarbonate diol, those described in Patent Literature 4 have been known.

CITATION LIST

Patent Literature

[Patent Literature 1] JP-A-2012-184385
[Patent Literature 2] JP-A-2014-189572
[Patent Literature 3] JP-A-2014-77069
[Patent Literature 4] WO2016/002873

SUMMARY OF THE INVENTION

Technical Problem

Considering the problems above, it would be beneficial to discover a novel urethane (meth)acrylate oligomer having a polycarbonate diol skeleton, which is suitably balanced between high strength and high elongation.

This invention is aimed at solving the aforementioned problems, and is to provide a urethane (meth)acrylate capable of achieving high strength and high elongation even after cured by applying active energy or the like, as well as a method for manufacturing a urethane (meth)acrylate, a curable composition, a cured article, and a method for manufacturing a cured article.

Solution to Problem

The present inventors found, after our extensive investigations aimed at reaching the goal, that the aforementioned problems could be solved by using a urethane (meth)acrylate that has a polycarbonate diol skeleton bound with a specific substituent. More specifically, the aforementioned problems were solved by means <1> below, and preferably by means <2> to <18> below.

<1> A urethane (meth)acrylate comprising a structural unit derived from polycarbonate diol, a structural unit derived from polyisocyanate, and a hydroxy group-containing (meth)acrylate-derived group, the polycarbonate diol containing one or more types of structural unit represented by formula (1) below:

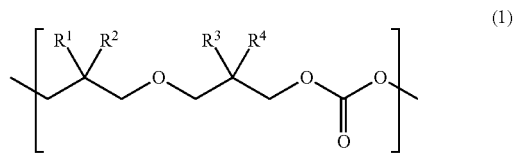

wherein each of $R^1$, $R^2$, $R^3$ and $R^4$ independently represents an aliphatic hydrocarbon group having 1 to 6 carbon atoms.

<2> The urethane (meth)acrylate of <1>, wherein in at least one type of the structural unit represented by formula (1), a combination of $R^1$ and $R^2$, and a combination of $R^3$ and $R^4$, are different from each other.

<3> The urethane (meth)acrylate of <1>, wherein in at least one type of the structural unit represented by formula (1), each of $R^1$ and $R^2$ represents a methyl group.

<4> The urethane (meth)acrylate of <1>, wherein in at least one type of the structural unit represented by formula (1), each of $R^1$, $R^2$, $R^3$ and $R^4$ represents a methyl group.

<5> The urethane (meth)acrylate of any one of <1> to <4>, wherein the structural unit represented by formula (1) accounts for 20 mol % or more of all the structural units composing the polycarbonate diol.

<6> The urethane (meth)acrylate of any one of <1> to <5>, wherein the polycarbonate diol has a number-average molecular weight of 400 to 5000.

<7> The urethane (meth)acrylate of any one of <1> to <6>, wherein the polyisocyanate is a diisocyanate.

<8> The urethane (meth)acrylate of any one of <1> to <7>, wherein the hydroxy group-containing (meth)acrylate has one hydroxy group in one molecule.

<9> The urethane (meth)acrylate of any one of <1> to <8>, wherein the hydroxy group-containing (meth)acrylate is a monofunctional (meth)acrylate.

<10> A method for manufacturing a urethane (meth)acrylate comprising allowing a polycarbonate diol that contains a structural unit represented by formula (1), to react with a polyisocyanate, and then to react with a hydroxy group-containing (meth)acrylate:

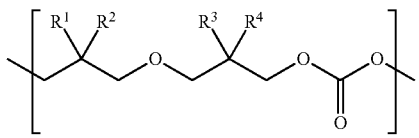

wherein each of $R^1$, $R^2$, $R^3$ and $R^4$ independently represents an aliphatic hydrocarbon group having 1 to 6 carbon atoms.

<11> A method for manufacturing the urethane (meth)acrylate described in any one of <1> to <9>, the method comprising allowing a polycarbonate diol that contains a structural unit represented by formula (1), a polyisocyanate, and a hydroxy group-containing (meth)acrylate to react.

<12> A curable composition containing the urethane (meth)acrylate described in any one of <1> to <9>.

<13> The curable composition of <12>, further comprising an active energy-reactive monomer and a radical polymerization initiator.

<14> The curable composition of <13>, containing 10 to 300 parts by mass of the active energy-reactive monomer, per 100 parts by mass of the urethane (meth)acrylate.

<15> The curable composition of <13> or <14>, wherein the active energy-reactive monomer is a (meth)acrylate compound.

<16> A cured article obtained by curing the curable composition of any one of <12> to <15>.

<17> A method for manufacturing a cured article, the method comprising applying the curable composition described in any one of <12> to <15> onto a substrate, and applying active energy.

<18> A cure article obtained by applying the curable composition described in any one of <12> to <15> onto a substrate, and applying active energy.

Advantageous Effects of Invention

By using the novel urethane (meth)acrylate of this invention, which has a polycarbonate diol skeleton, it now became possible to provide a urethane (meth)acrylate capable of achieving high strength and high elongation even after cured by applying active energy or the like, as well as a method for manufacturing a urethane (meth)acrylate, a curable composition, a cured article, and a method for manufacturing a cured article.

DESCRIPTION OF EMBODIMENTS

This invention will be detailed below. Note that all numerical ranges given in this specification, using "to" preceded and succeeded by numerals, are used to represent the ranges including these numerals respectively as the lower and upper limit values.

In this specification, (meth)acrylate collectively means acrylate and methacrylate, that is, either one of or both of acrylate and methacrylate.

A novel urethane (meth)acrylate of this invention is featured by having a structural unit derived from polycarbonate diol, a structural unit derived from polyisocyanate, and a hydroxy group-containing (meth)acrylate-derived group, the polycarbonate diol containing one or more types of structural unit represented by formula (1) below:

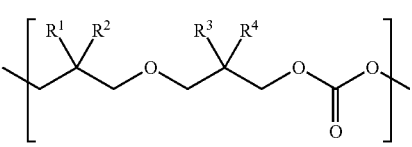

(in the formula, each of $R^1$, $R^2$, $R^3$ and $R^4$ independently represents an aliphatic hydrocarbon group having 1 to 6 carbon atoms).

The urethane (meth)acrylate is, for example, a reaction product of a starting material that contains (1) polycarbonate diol, (2) polyisocyanate, and (3) hydroxy group-containing (meth)acrylate. The starting material may further contain (4) other compound(s).

With such design, obtainable is a urethane (meth)acrylate that excels both in strength and elongation.

Since the urethane (meth)acrylate of this invention also excels in heat resistance and anti-fouling property, so that when made into a cured article, it can enhance the usefulness and can expand the applicable range. The heat resistance in this context means that YI value increases only to a small degree after heating. The YI value is a parameter for indicating yellowness, wherein the larger the value, the stronger the yellowness. Meanwhile, the antifouling property means that haze increases only to a small degree when treated with silica gel. The haze is an index regarding transparency, or turbidity (opacity), which is determined based on the ratio of diffusion transmittance to the total light transmittance, and is expressed on a scale of 0 to 100%. The smaller the value, the higher the transparency, meanwhile the larger the value, the more the surface looks opaque.

The individual starting materials will be explained below.
<(1) Polycarbonate Diol>
The urethane (meth)acrylate of this invention contains the structural unit derived from polycarbonate diol. The polycarbonate diol contains one or more types of structural unit represented by formula (1) below:

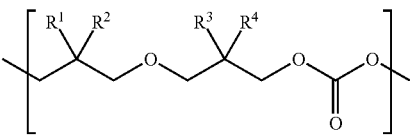

(in the formula, each of $R^1$, $R^2$, $R^3$ and $R^4$ independently represents an aliphatic hydrocarbon group having 1 to 6 carbon atoms.)

Each of $R^1$, $R^2$, $R^3$ and $R^4$ independently and preferably represents a straight-chain or branched alkyl group having 1 to 6 carbon atoms, and more preferably represents a methyl group, ethyl group, n-propyl group, 1-methylethyl group (isopropyl group), n-butyl group, 1-methylpropyl group, 2-methylpropyl group, 1,1-dimethylethyl group (t-butyl group), n-pentyl group, 1-methylbutyl group, 2-methylbutyl group, 3-methylbutyl group, 1-ethylpropyl group, 1,1-dimethylpropyl group, 1,2-dimethylpropyl group, 2,2-dimethylpropyl group (neopentyl group), n-hexyl group, 1-methylpentyl group, 2-methylpentyl group, 3-methylpentyl group, 4-methylpentyl group, 1,1-dimethylbutyl group, 1,2-dimethylbutyl group, 1,3-dimethylbutyl group, 2,2-dimethylbutyl group, 2,3-dimethylbutyl group, 3,3-dimethylbutyl group, 1-ethylbutyl group, 2-ethylbutyl group, 1,1,2-trimethylpropyl group, 1,2,2-trimethylpropyl group, 1-ethyl-1-methylpropyl group, or, 1-ethyl-2-methylpropyl group.

Among them, more preferable are methyl group, ethyl group, n-propyl group, 1-methylethyl group (isopropyl group), n-butyl group, 1-methylpropyl group, 2-methylpropyl group, n-pentyl group, 1-methylbutyl group, 2-methylbutyl group, 3-methylbutyl group, 1-ethylpropyl group, and, n-hexyl group, and even more preferable are methyl group, ethyl group, n-propyl group, and, n-butyl group.

In this invention, one preferred embodiment is exemplified by the case where $R^1$ to $R^4$ represent the same group, in at least one type of the structural unit represented by formula (1) (preferably, in 80 mol % or more of the structural unit represented by formula (1)).

In this invention, another preferred embodiment is exemplified by the case where a combination of $R^1$ and $R^2$, and a combination of $R^3$ and $R^4$, are different from each other, in at least one type of the structural unit represented by formula (1) (preferably, in 80 mol % or more of the structural unit represented by formula (1)).

In this invention, it is more preferable that each of $R^1$ and $R^2$ represents a methyl group, in at least one type of the structural unit represented by formula (1) (preferably, in 80 mol % or more of the structural unit represented by formula (1)).

It is even more preferable that each of $R^3$ and $R^4$ is independently selected from methyl group, ethyl group, n-propyl group, n-butyl group, n-pentyl group, and n-hexyl group, in at least one type of the structural unit represented by formula (1) (preferably, in 80 mol % or more of the structural unit represented by formula (1)). $R^3$ more preferably represents a methyl group or ethyl group, wherein methyl group is more preferable. $R^4$ more preferably represents a group selected from methyl group, ethyl group, n-propyl group and n-butyl group, wherein methyl group is more preferable.

Specific examples of the structural unit represented by formula (1) are exemplified by those satisfying the conditions below, in at least one type of the structural unit represented by formula (1) (preferably, in 80 mol % or more of the structural unit represented by formula (1)). In this invention, it is particularly preferable to satisfy (A).

(A) All of $R^1$ to $R^4$ represent a methyl group.

(B) $R^1$ and $R^2$ represent a methyl group, $R^3$ represents an ethyl group, and $R^4$ represents an n-butyl group.

(C) $R^1$ and $R^2$ represent a methyl group, and $R^3$ and $R^4$ represent an ethyl group.

(D) All of $R^1$ to $R^3$ represent a methyl group, and $R^4$ represents an n-propyl group.

Preferably 90% or more of the polycarbonate diol used in this invention contains a hydroxy group at the terminals.

The polycarbonate diol used in this invention preferably contains one or more types of the structural unit represented by formula (1) above, which preferably accounts for 20 mol % or more of all the structural units composing the polycarbonate diol, more preferably accounts for 40 mol % or more, even more preferably accounts for 50 mol % or more, yet more preferably accounts for 60 mol % or more, and furthermore preferably accounts for 90 mol % or more. The upper limit of content of the one or more types of the structural unit represented by formula (1) is not specifically limited, and may even be 100 mol %. Other structural units are exemplified by those represented by formula (1-1) described later. With such design, the obtainable urethane (meth)acrylate will have more improved weather resistance and heat resistance (in particular, heat aging resistance).

Such other structural units, which may be owned by the polycarbonate diol used in this invention, are exemplified by diol-derived structural units, and preferably by structural units represented by formula (1-1) below:

Formula (1-1)

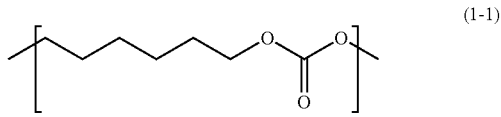

(1-1)

The polycarbonate diol used in this invention, when containing the structural unit represented by formula (1-1), preferably contains 70 to 40 mol %, relative to all the structural units, of one or more types of structural units represented by formula (1), and 30 to 60 mol % of the structural unit represented by formula (1-1).

The number-average molecular weight of the polycarbonate diol used in this invention is preferably 400 or above at the lowest, which is more preferably 500 or above, even more preferably 800 or above, and particularly preferably 900 or above. With the number-average molecular weight controlled to 400 or larger, the elongation will tend to be improved. The number-average molecular weight is preferably 5000 or below at the highest, more preferably 4000 or below, even more preferably 3000 or below, yet more preferably 2000 or below, furthermore preferably 1500 or below, and still more preferably 1300 or below. With the number-average molecular weight controlled to 5000 or smaller, the workability and strength will tend to be improved.

The number-average molecular weight of the polycarbonate diol is measured by the method described later in EXAMPLES. If instruments described in EXAMPLES were no more available for discontinuation or other reasons, any instruments with equivalent performances may be used (the same will apply to other methods, hereinafter).

Method for manufacturing the polycarbonate diol used in this invention is not specifically limited, and may be synthesized based on a transesterification reaction between a carbonate diester, and a diol compound that contains a diol represented by formula (2):

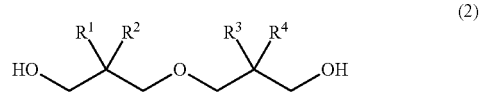

(2)

(in the formula, each of $R^1$, $R^2$, $R^3$ and $R^4$ independently represents an aliphatic hydrocarbon group having 1 to 6 carbon atoms). $R^1$, $R^2$, $R^3$ and $R^4$ are synonymous to $R^1$, $R^2$, $R^3$ and $R^4$ in formula (1). The same will apply to their preferred ranges.

The carbonic diester is exemplified by dialkyl carbonate, diaryl carbonate and alkylene carbonate. Only one type, or two or more types of the carbonic diester may be used.

The dialkyl carbonate is exemplified by dimethyl carbonate, diethyl carbonate and dibutyl carbonate.

The diaryl carbonate is exemplified by diphenyl carbonate, ditolyl carbonate and m-cresyl carbonate.

The alkylene carbonate is exemplified by ethylene carbonate, trimethylene carbonate, 1,2-propylene carbonate and neopentyl carbonate.

The content of carbonic diester is preferably 0.70 to 1.10 mol per one mole in total of the diol compound, and is more preferably 0.75 to 1.05 mol.

In the transesterification reaction, a transesterification catalyst may be used. The transesterification catalyst is free of choice from those having ordinary transesterification ability. The examples include alkali metal compounds such as potassium hydroxide, sodium hydroxide, sodium carbonate, potassium carbonate, sodium methoxide, sodium ethoxide, potassium methoxide and potassium ethoxide; alkali earth metal compounds such as magnesium hydroxide, calcium hydroxide, magnesium carbonate and calcium carbonate; and transition metal compounds such as titanium (IV) tetraethoxide, titanium(IV) tetraisopropoxide, titanium tetra-n-butoxide, zinc acetate, zinc benzoate, zinc 2-ethylhexanoate, tin chloride, tin acetate, tin di-n-butyltin dilaurate, di-n-butyltin diacetate, di-n-butyltin oxide, zirconium tetraacetylactonate, zirconium tetrabutoxide and lead acetate.

The amount of consumption of transesterification catalyst is preferably determined so as not to adversely affect the urethanation reaction. Ratio by mass of metal, relative to the mass of starting diol compound, is preferably 0.01 to 500 ppm by mass, more preferably 0.1 to 100 ppm by mass, and even more preferably 1 to 50 ppm by mass.

Reaction temperature of transesterification will suffice if it just allows the reaction to proceed at a practical speed, and is preferably 70 to 280° C., and more preferably 100 to 240° C. Since the transesterification reaction is an equilibrium reaction, so that it is preferable to allow the reaction to proceed while distilling off low-boiling-point components. Hence it is recommendable to gradually reduce the pressure in the latter half of the reaction process. It is also preferable to allow the reaction to proceed under flow of an inert gas such as nitrogen, argon or the like, in order to efficiently distill off the low-boiling-point components, and to prevent coloration.

Only one type, or two or more types of diols may be used for transesterification with the carbonic diester. Besides the diols represented by formula (2), one type or two or more types of other diols may be used.

Specific examples of such diols usable together include aliphatic diols such as ethylene glycol, 1,2-propylene glycol, 1,3-propanediol, 1,3-butanediol, 2-methyl-1,3-propanediol, 1,3-pentanediol, 2,4-pentanediol, 2-methyl-1,3-butanediol, neopentyl glycol, 1,3-hexanediol, 3-methyl-1,3-butanediol, 1,5-pentanediol, 2-methyl-1,5-pentanediol, 3-methyl-1,5-pentanediol, 1,5-hexanediol, 2-ethyl-1,5-pentanediol, 2-ethyl-1,6-hexanediol, 2-propyl-1,5-pentanediol, 2,2-diethyl-1,3-propanediol, 2-methyl-2-propyl-1,3-propanediol, 2-butyl-2-ethyl-1,3-propanediol, 2,2-diphenyl-1,3-propanediol, 3,3-dimethyl-1,5-pentanediol, 2-methyl-1,2-propanediol, 2,2,4,4-tetramethyl-1,5-pentanediol, 2,2,9,9-tetramethyl-1,10-decanediol, 1,4-butanediol, 1,6-hexanediol, 1,7-heptanediol, 1,8-octanediol, 2,5-hexanediol, 1,9-nonanediol, 1,10-decanediol, 2-methyl-1,8-octanediol, diethylene glycol, triethylene glycol, metaxylylene glycol, paraxylylene glycol, polyethylene glycol, polypropylene glycol and polybutylene glycol; alicyclic diols such as 1,3-cyclohexanediol, 1,4-cyclohexanediol, 1,3-cyclohexane dimethanol, 1,4-cyclohexane dimethanol, 1,2-decahydronaphthalene dimethanol, 1,3-decahydronaphthalene dimethanol, 1,4-decahydronaphthalene dimethanol, 1,5-decahydronaphthalene dimethanol, 1,6-decahydronaphthalene dimethanol, 2,7-decahydronaphthalene dimethanol, tetralin dimethanol, norbornane dimethanol, tricyclodecane dimethanol, 5-methylol-5-ethyl-2-(1,1-dimethyl-2-hydroxyethyl)-1,3-dioxane, pentacyclododecane dimethanol, 2,2'-bis(4-hydroxycyclohexyl)propane, 1,4-dihydroxyethylcyclohexane, isosorbide, 2,5-bis(hydroxymethyl) tetrahydrofuran and 3,9-bis(1,1-dimethyl-2-hydroxyethyl)-2,4,8,10-tetraoxaspiro[5.5]undecane; alkylene oxide adducts of bisphenols such as 2,2-bis(4-hydroxyphenyl) propane (bisphenol A), bis(4-hydroxyphenyl)methane (bisphenol F), 1,1-bis(4-hydroxyphenyl)ethane, 1,1-bis(4-hydroxyphenyl)butane, 1,1-bis(4-hydroxyphenyl)pentane, 2,2-bis(4-hydroxyphenyl)pentane, 3,3-bis(4-hydroxyphenyl) pentane, 2,2-bis(3-methyl-4-hydroxyphenyl)propane, 1,1-bis(4-hydroxyphenyl)cyclohexane (bisphenol Z), 4,4'-dihydroxydiphenyl ether, 4,4'-dihydroxydiphenyl sulfide, 4,4'-dihydroxydiphenyl sulfoxide and 4,4'-dihydroxydiphenyl sulfone; alkylene oxide adducts of aromatic dihydroxy compounds such as hydroquinone, resorcin, 4,4'-dihydroxybiphenyl, 4,4'-dihydroxydiphenyl ether and 4,4'-dihydroxydiphenylbenzophenone; and aromatic diols such as 2,2-bis(4-hydroxyphenyl)propane (bisphenol A), bis(4-hydroxyphenyl)methane (bisphenol F), 1,1-bis(4-hydroxyphenyl)ethane, 1,1-bis(4-hydroxyphenyl)butane, 1,1-bis(4-hydroxyphenyl)pentane, 2,2-bis(4-hydroxyphenyl)pentane, 3,3-bis(4-hydroxyphenyl)pentane, 2,2-bis(3-methyl-4-hydroxy-phenyl)propane, 1,1-bis(4-hydroxyphenyl)cyclohexane (bisphenol Z), 4,4'-dihydroxydiphenyl ether, 4,4'-dihydroxydiphenyl sulfide, 4,4'-dihydroxydiphenyl sulfoxide, 4,4'-dihydroxydiphenyl sulfone, hydroquinone, resorcin, 4,4'-dihydroxybiphenyl, 4,4'-dihydroxydiphenyl ether and 4,4'-dihydroxydiphenylbenzophenone.

A small amount of structural unit, started from tri- or higher functional polyol, may be contained. The tri- or higher functional polyol is exemplified by glycerin, trimethylolethane, trimethylolpropane, ditrimethylolpropane, pentaerythritol and dipentaerythritol.

Among them, preferable are aliphatic diols such as ethylene glycol, 1,2-propylene glycol, 1,3-propanediol, 1,3-butanediol, 2-methyl-1,3-propanediol, 1,3-pentanediol, 2,4-pentanediol, 2-methyl-1,3-butanediol, neopentyl glycol, 1,3-hexanediol, 3-methyl-1,3-butanediol, 1,5-pentanediol, 2-methyl-1,5-pentanediol, 3-methyl-1,5-pentanediol, 1,5-hexanediol, 2-ethyl-1,5-pentanediol, 2-propyl-1,5-pentanediol, 2,2-diethyl-1,3-propanediol, 2-methyl-2-propyl-1,3-propanediol, 2-butyl-2-ethyl-1,3-propanediol, 2-methyl-1,2-propanediol, 1,4-butanediol, 1,6-hexanediol, 2,5-hexanediol, 1,9-nonanediol, 2-methyl-1,8-octanediol, diethylene glycol, triethylene glycol, metaxylylene glycol, paraxylylene glycol, polyethylene glycol, polypropylene glycol and polybutylene glycol; more preferable are 1,3-propanediol, 2-methyl-1,3-propanediol, neopentyl glycol, 3-methyl-1,3-butanediol, 1,5-pentanediol, 2,2-diethyl-1,3-propanediol, 2-methyl-2-propyl-1,3-propanediol, 2-butyl-2-ethyl-1,3-propanediol, 2-methyl-1,2-propanediol, 1,4-butanediol, 1,6-hexanediol, 1,9-nonanediol and 2-methyl-1,8-octanediol; and particularly preferable is 1,6-hexanediol.

As for other details of the polycarbonate diol used in this invention, the descriptions in paragraphs [0009], and [0011] to [0035] of WO2016/002873 may be referred to, the contents of which are incorporated by reference into this specification.

<(2) Polyisocyanate>

The urethane (meth)acrylate of this invention contains the structural unit derived from polyisocyanate. The polyisocyanate is a compound having two or more isocyanate groups, and preferably has 2 to 10 isocyanate groups, more preferably has 2 to 4 isocyanate groups, and even more preferably has two isocyanate groups (diisocyanate). In this invention, diisocyanate preferably accounts for 90 mol % or more of the polyisocyanate that composes the structural unit derived from polyisocyanate, which is more preferably 95 mol % or more, even more preferably 97 mol % or more, and yet more preferably 99 mol % or more. With the ratio of diisocyanate controlled to 90 mol % or more, the urethane (meth)acrylate will have larger elongation. Meanwhile, with the ratio of tri- or higher functional isocyanate controlled to 10 mol % or less, the strength may be improved, while keeping large elongation.

The polyisocyanate used in this invention is exemplified by polyisocyanate having an aliphatic group, polyisocyanate having an alicyclic structure, and polyisocyanate having an aromatic group.

Only one type, or two or more types of polyisocyanates may be used. Representative example of the individual polyisocyanates will be enumerated below.

Polyisocyanate Having Aliphatic Group

Exemplified are bi-functional isocyanate such as tetramethylene diisocyanate, hexamethylene diisocyanate, heptamethylene diisocyanate, octamethylene diisocyanate, 2,2,4- and/or 2,4,4-trimethyl hexamethylene diisocyanate, and, lysine diisocyanate; and tri-functional isocyanates such as 1,6,11-undecanetriisocyanate, 1,3,6-hexamethylenetriisocyanate, and, tris(isocyanatohexyl)isocyanurate.

Polyisocyanate Having Alicyclic Structure

Exemplified are bi-functional isocyanates such as isophorone diisocyanate, 2,4- and/or 2,6-methylcyclohexane diisocyanate, dicyclohexylmethane-4,4'-diisocyanate, cyclohexane diisocyanate, bis(isocyanatomethyl)cyclohexane, diisocyanic acid, 2,6-norbornane diisocyanate, and, bis(2-isocyanatoethyl)-4-cyclohexene-1,2-dicarboxylate; and tri-functional isocyanates such as bicycloheptane triisocyanate.

Polyisocyanate Having Aromatic Group

Exemplified are 1,3-phenylene diisocyanate, 1,4-phenylene diisocyanate, 2,4-tolylene diisocyanate, 2,6-tolylene diisocyanate, 4,4'-diphenylmethane diisocyanate, 2,4'-diphenylmethane diisocyanate, 4,4'-diisocyanatobiphenyl, 3,3'-dimethyl-4,4'-diisocyanatobiphenyl, 3,3'-dimethyl-4,4'-diisocyanatodiphenylmethane, 1,5-naphthalene diisocyanate and xylylene diisocyanate.

<(3) Hydroxy Group-Containing (Meth)acrylate>

Hydroxy group-containing (meth)acrylate in this invention may be a hydroxy group-containing monofunctional (meth)acrylate, or may be a hydroxy group-containing polyfunctional (meth)acrylate. Preferable are hydroxy group-containing mono- to hexa-functional (meth)acrylates; more preferable are hydroxy group-containing mono- to tetra-functional (meth)acrylates; even more preferable are hydroxy group-containing mono- to tri-functional (meth) acrylate; yet more preferable is hydroxy group-containing mono- or bi-functional (meth)acrylate; and furthermore preferable is hydroxy group-containing mono-functional (meth)acrylate.

The hydroxy group-containing (meth)acrylate is furthermore preferably a hydroxyalkyl group-containing (meth) acrylate.

The hydroxy group-containing (meth)acrylate is furthermore preferably a hydroxy group-containing acrylate.

The hydroxy group-containing (meth)acrylate may have one, or two or more hydroxy groups in one molecule. The hydroxy group-containing (meth)acrylate preferably has 1 to 9 hydroxy groups in one molecule, more preferably has 1 to 3 hydroxy groups, and even more preferably one hydroxy group.

Hydroxy group contained in the hydroxyalkyl group may be a primary hydroxy group, or may be a secondary hydroxy group.

Only one type of the hydroxy group-containing (meth) acrylate may be used, or two or more types thereof may be used in a mixed manner.

The hydroxy group-containing (meth)acrylate used in this invention preferably has a molecular weight of 100 to 1000, which is more preferably 100 to 500.

Representative examples of the hydroxy group-containing (meth)acrylate will be enumerated below.

Examples of the hydroxy group-containing mono-functional (meth)acrylate include 2-hydroxyethyl (meth)acrylate, adduct of 2-hydroxyethyl (meth)acrylate, ε-caprolactone adduct of 2-hydroxyethyl (meth)acrylate, 2-hydroxypropyl (meth)acrylate, alkylene oxide adduct of 2-hydroxypropyl (meth)acrylate, ε-caprolactone adduct of 2-hydroxypropyl (meth)acrylate, 4-hydroxybutyl (meth)acrylate, alkylene oxide adduct of 4-hydroxybutyl (meth)acrylate, ε-caprolactone adduct of 4-hydroxybutyl (meth)acrylate, 6-hydroxyhexyl (meth)acrylate, and, reaction products formed between (meth)acrylic acid and alkylene oxide, such as 2-hydroxy-3-phenoxypropyl (meth)acrylate and 2-hydroxy-3-biphenoxypropyl (meth)acrylate.

The alkylene oxide is exemplified by ethylene oxide and propylene oxide.

The alkylene oxide adduct means a compound obtained by addition of alkylene oxide. As an example, an ethylene oxide adduct of 2-hydroxyethyl acrylate will be shown below.

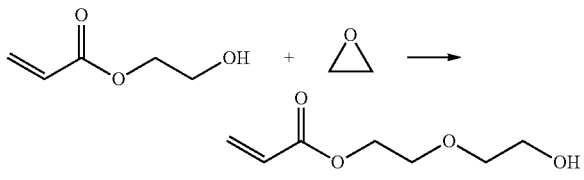

The ε-caprolactone adduct means a compound obtained by addition of ε-caprolactone. As an example, an ε-caprolactone adduct of 2-hydroxyethyl acrylate will be shown below.

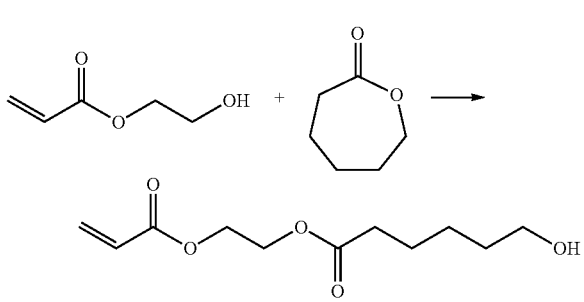

The hydroxy group-containing polyfunctional (meth) acrylate is exemplified by glycerin di(meth)acrylate, trimethylolpropane di(meth)acrylate, pentaerythritol tri(meth) acrylate, ditrimethylolpropane tri(meth)acrylate and dipentaerythritol penta(meth)acrylate.

<Other Structural Unit>

The urethane (meth)acrylate of this invention may contain a structural unit other than the structural unit derived from polycarbonate diol, the structural unit derived from polyisocyanate, and the hydroxy group-containing (meth)acrylate-derived group. More specifically, the urethane (meth)acrylate may contain a high molecular weight polyol having a number-average molecular weight of 500 or larger, and/or, a low molecular weight polyol-derived structural unit having a number-average molecular weight of smaller than 500, or a chain extender-derived structural unit.

The urethane (meth)acrylate having such other structural unit may contain, as its starting material, at least one compound selected from high molecular weight polyol having a number-average molecular weight of 500 or larger, low molecular weight polyol having a number-average molecular weight of smaller than 500, and chain extender, besides (1) polycarbonate diol, (2) polyisocyanate, and (3) hydroxy group-containing (meth)acrylate.

The high molecular weight polyol is a compound having a number-average molecular weight of 500 or larger, having two or more hydroxy groups, but having no structural unit represented by formula (1). Only one type, or two or more types of the high molecular weight polyol may be used.

The high molecular weight polyol is exemplified by polyether diol, polyester diol, polyether ester diol, polycarbonate diol having no structural unit represented by formula (1), polyester-modified polycarbonate diol having no structural unit represented by formula (1), polyolefin polyol, and, silicone polyol.

The low molecular weight polyol is a compound having two or more hydroxy groups, and a number-average molecular weight of smaller than 500. Only one type, or two or more types thereof may be used.

The low molecular weight polyol is exemplified by ethylene glycol, diethylene glycol, propylene glycol, dipropylene glycol, 1,3-propanediol, 2-methyl-1,3-propanediol, 2,2-dimethyl-1,3-propanediol, 2-methyl-2-butyl-1,3-propanediol, 1,2-butanediol, 1,3-butanediol, 1,4-butanediol, 2,3-butanediol, 1,5-pentanediol, 2-methyl-1,5-pentanediol, 3-methyl-1,5-pentanediol, 2,2,4-trimethyl-1,5-pentanediol, 2,3,5-trimethyl-1,5-pentanediol, 1,6-hexanediol, 2-ethyl-1,6-hexanediol, 2,2,4-trimethyl-1,6-hexanediol, 3,3-dimethylolheptane, 1,8-octanediol, 1,9-nonanediol, cyclopropanediol, cyclopropane dimethanol, cyclopropane di ethanol, cyclobutanediol, cyclobutane dimethanol, cyclopentanediol, cyclopentane dimethanol, cyclohexanediol, cyclohexane dimethanol, cyclohexenediol, cyclohexene dimethanol, hydrogenated bisphenol A, tricyclodecanediol, adamantyl diol, bis(hydroxyethoxy)benzene, bis(hydroxyethyl) terephthalate, bisphenol A, pentaerythritol, sorbitol, mannitol, glycerin and trimethylolpropane.

The chain extender, other than the low molecular weight polyol, is exemplified by polyamines such as ethylenediamine, propylenediamine, hexamethylenediamine, trimethyl hexamethylenediamine, isophoronediamine, 4,4'-dicyclohexylmethane diamine, diaminocyclohexane, methyldiaminocyclohexane and norbornenediamine. Only one type of the chain extender may be used, or two or more types may be used together.

<Preferred Structure of Urethane (Meth)acrylate>

The urethane (meth)acrylate of this invention has the structural unit derived from polycarbonate diol, the structural unit derived from polyisocyanate, and the hydroxy group-containing (meth)acrylate-derived group; the structure of which may properly be determined so long as polycarbonate diol contains one or more types of the structural unit represented by formula (1).

The urethane (meth)acrylate of this invention is preferably such that the urethane bond thereof is formed by a reaction between (1) polycarbonate diol and (2) polyisocyanate, and, that it has a hydroxy group-containing (meth)acrylate-derived group at the terminal thereof.

The urethane (meth)acrylate of this invention may be an oligomer or may be a polymer, and may preferably be an oligomer.

The urethane (meth)acrylate of this invention may be a mono-functional urethane (meth)acrylate (having one (meth)acryl group in one molecule), or may be a bi-functional urethane (meth)acrylate, or may be a tri- or higher functional urethane (meth)acrylate, wherein it is preferably a bi-functional urethane (meth)acrylate or tri- or higher functional urethane (meth)acrylate, and more preferably a bi-functional urethane (meth)acrylate.

Moreover, the urethane (meth)acrylate of this invention is preferably urethane acrylate.

The urethane (meth)acrylate of this invention is preferably represented by formula (X) below.

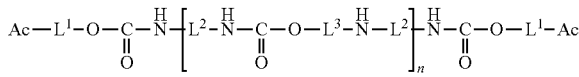

Formula (X)

(In formula (X), Ac represents a (meth)acryloyloxy group, $L^1$ each independently represents a divalent hydrocarbon group, $L^2$ each independently represents a divalent hydrocarbon group, and $L^3$ represents a divalent group that contains the structural unit represented by formula (1)).

Ac-$L^1$ moiety is preferably derived from hydroxy group-containing (meth)acrylate. $L^1$ preferably each independently represents an alkylene group.

$L^2$ is preferably derived from polyisocyanate, and each independently represents a divalent aliphatic group, divalent alicyclic group, divalent aromatic group, or divalent groups given by combinations of them.

$L^3$ is preferably derived from polycarbonate diol that contains one or more types of the structural units represented by formula (1), and is more preferably a divalent group that contains 20 mol % or more of the structural unit represented by formula (1).

n Represents a positive number, which is preferably 3.3 to 25, and more preferably 3.7 to 13.

The urethane (meth)acrylate of this invention preferably has a number-average molecular weight of 900 or larger at the lowest, more preferably 1000 or larger, even more preferably 1300 or larger, yet more preferably 2000 or larger, and furthermore preferably 2400 or larger. Meanwhile the number-average molecular weight is preferably 50000 or smaller at the highest, more preferably 10000 or smaller, even more preferably 6000 or smaller, yet more preferably 5500 or smaller, furthermore preferably 4500 or smaller, still more preferably 4000 or smaller, and particularly preferably 3800 or smaller. Within these ranges, high strength and large elongation may be achieved in a more efficient manner.

The number-average molecular weight in this invention is measured according to the method described later in EXAMPLES.

In this invention, value of (structural unit derived from polyisocyanate):(structural unit derived from polycarbonate diol):(hydroxy group-containing (meth)acrylate-derived group) in the urethane (meth)acrylate (mole ratio) is preferably (1.35 to 2.15):1.0:(1.1 to 2.3), and more preferably (1.55 to 2.0):1.0:(1.3 to 2.0).

Method for Manufacturing Urethane (Meth)acrylate

The method for manufacturing a urethane (meth)acrylate of this invention includes allowing a polycarbonate diol that contains a structural unit represented by formula (1), a polyisocyanate, and a hydroxy group-containing (meth) acrylate to react.

This invention also discloses a method for manufacturing a urethane (meth)acrylate that includes allowing a polycarbonate diol having the structural unit represented by formula (1), to react with a polyisocyanate, and then with a hydroxy group-containing (meth)acrylate. Details of formula (1) are synonymous to those for formula (1) described above. The same will apply to their preferred ranges.

When manufacturing the urethane (meth)acrylate of this invention, the reaction temperature is typically 40° C. or above, and preferably 60° C. or above. Under the reaction temperature of 40° C. or above, the reaction rate will increase, and thereby the productivity will increase. Meanwhile, the reaction temperature is typically 120° C. or below, and preferably 100° C. or below. Under the reaction temperature of 120° C. or below, side reaction such as biuret formation, allophanate formation and polymerization of (meth)acrylate may effectively be suppressed. The reaction time is preferably 1 to 5 hours. When the polycarbonate diol having the structural unit represented by formula (1) is allowed to react with the polyisocyanate, and then allowed to react with the hydroxy group-containing (meth)acrylate, the temperature at which the polycarbonate diol and the polyisocyanate are allowed to react, and the temperature at which the reaction product is allowed to react with the hydroxy group-containing (meth)acrylate, may be same or different.

When manufacturing the urethane (meth)acrylate of this invention, mole equivalent ratio of hydroxy group of the polycarbonate diol, and isocyanate group is preferably 1:(1.1 to 3.0), and is more preferably 1:(1.25 to 2.0). Within these ranges, a higher level of elongation may be achieved without degrading the strength.

When manufacturing the urethane (meth)acrylate of this invention, mole equivalent ratio of isocyanate group, and hydroxy group in the hydroxy group-containing (meth) acrylate is preferably 1:(0.1 to 2.5), and is more preferably 1:(0.25 to 1.3). Within these ranges, the isocyanate group will remain, and this prevents the physical properties from degrading, and suitably balances higher strength and larger elongation.

The urethane (meth)acrylate may be manufactured in the presence of organic solvent such as ethyl acetate or methyl ethyl ketone, or aqueous medium, and even may be manufactured in the presence of (meth)acrylate compound that exists in the form of liquid at the reaction temperature, rather than the organic solvent or aqueous medium. In particular, manufacturing without using solvent, or manufacturing under the presence of (meth)acrylate compound that exists in the form of liquid at the reaction temperature, is preferable since removal of the organic solvent or aqueous medium is omissible.

When manufacturing the urethane (meth)acrylate of this invention, a polymerization inhibitor or a urethanation catalyst may optionally be used.

The polymerization inhibitor is exemplified by hydroquinone, methylhydroquinone, hydroquinone monomethyl ether, para-t-butylcatechol, methoxyphenol, 3,5-bis-t-butyl-4-hydroxytoluene, 2,6-di-t-butylcresol, phenothiazine, tetramethylthiuram disulfide, diphenylamine and dinitorobenzene.

When using the polymerization inhibitor, the amount of consumption is preferably 0.001 to 0.2% by mass of the polycarbonate diol. Only one type of, or two or more types of the polymerization inhibitors may be used. When two or more types are used, the total content preferably falls within the above described range.

The urethanation catalyst is exemplified by nitrogen-containing compounds such as triethylamine, triethylenediamine, and N-methylmorpholine; metal salts such as potassium acetate, zinc stearate and tin octylate; and organometallic compounds such as dibutyltin dilaurate, tetrabutoxytitanium and tetraisopropoxytitanium.

When using the polymerization inhibitor, the amount of consumption is preferably 0.001 to 0.1% by mass of the polycarbonate diol. Only one type, or two or more types of the urethanation catalyst may be used. When two or more types are used, the total content preferably falls within the above described range.

Curable Composition

This invention also discloses a curable composition that contains one type, or two or more types of the urethane (meth)acrylate. The content of urethane (meth)acrylate in the curable composition of this invention is preferably 30% by mass or above at the lowest, more preferably 40% by mass or above, and even more preferably 45% by mass or above. The content is preferably 90% by mass or below at the highest, more preferably 85% by mass or below, and even more preferably 80% by mass or below. Within these ranges, the obtainable cured article will have excellent strength and elongation.

The curable composition is preferably a curable composition that cures when applied with active energy, and may be a photo-curable composition or may be a heat-curable composition. The photo-curable composition is preferable. The active energy is exemplified by ultraviolet radiation, electron beam and heat energy. Ultraviolet radiation is preferable.

The curable composition of this invention may be mixed with an active energy-reactive monomer, from the viewpoint of reducing viscosity of the curable composition to improve the handleability, or to improve curability under applied active energy, or elasticity and adhesiveness of the cured article, without adversely affecting performances of the urethane (meth)acrylate oligomer.

To the curable composition of this invention, also a radical polymerization initiator (preferably, photoradical polymerization initiator) may be mixed, together with the active energy-reactive monomer.

The curable composition of this invention may contain a solvent, or may be substantially solvent-free. "Substantially solvent-free" means that the content of solvent in the curable composition is 3% by mass or less of the curable composition, which is more preferably 1% by mass or less, and even more preferably 0.5% by mass or less.

Viscosity of the curable composition of this invention is a matter of proper choice depending on applications, which may for example be 1 to 500 Pa·s at 25° C., and also may be 5 to 100 Pa·s.

<Active Energy-Reactive Monomer>

The active energy-reactive monomer usable in this invention is not specifically limited, so long as it is a compound curable when applied with active energy. The active energy-reactive monomer is exemplified by (meth)acrylate compound, and compound having vinyl group (vinyl group-containing compound). (Meth)acrylate compound is preferable, and acrylate compound is more preferable.

The active energy-reactive monomer is preferably liquid at 25° C. By using such compound, it becomes possible to reduce the viscosity of curable composition without mixing solvent.

The active energy-reactive monomer preferably has a molecular weight of 70 to 400, which is more preferably 100 to 300.

The active energy-reactive monomer may be a monofunctional monomer having a single active energy-reactive group, or may be a polyfunctional monomer having two or more active energy-reactive groups. Mono- to tri-functional monomers are preferable, mono- or bi-functional monomers are more preferable, and monofunctional monomer is even more preferable.

Of course, the active energy-reactive monomer is a compound other than the urethane (meth)acrylate of this invention.

Specific examples of the monofunctional (meth)acrylate compound, which is a monofunctional monomer, include phenoxyethyl (meth)acrylate, (meth)acrylate of 1 to 30-mol alkylene oxide adduct of phenol, tetrahydrofurfuryl (meth) acrylate, lauryl (meth)acrylate, stearyl (meth)acrylate, 2-ethylhexyl (meth)acrylate, benzyl (meth)acrylate, phenylethyl (meth)acrylate, methyl (meth)acrylate, ethyl (meth)acrylate, propyl (meth)acrylate, butyl (meth)acrylate, hexyl (meth) acrylate, 2-ethylhexyl (meth)acrylate, 2-hydroxyethyl (meth)acrylate, 2-hydroxypropyl (meth)acrylate, 4-hydroxybutyl (meth)acrylate, cyclohexyl (meth)acrylate, tricyclodecyl (meth)acrylate, dicyclopentenyl (meth)acrylate, dicyclopentenyloxyethyl (meth)acrylate, dicyclopentanyl (meth)acrylate, allyl (meth)acrylate, 2-ethoxyethyl (meth) acrylate, and, isobornyl (meth)acrylate.

Specific examples of the polyfunctional (meth)acrylate compound, which is a polyfunctional monomer, include ethylene glycol di(meth)acrylate, diethylene glycol di(meth) acrylate, triethylene glycol di(meth)acrylate, polyethylene glycol di(meth)acrylate, propylene glycol di(meth)acrylate, dipropylene glycol di(meth)acrylate, tripropylene glycol di(meth)acrylate, polypropylene glycol di(meth)acrylate, 1,4-butanediol di(meth)acrylate, 1,6-hexanediol di(meth) acrylate, 1,9-nonanediol di(meth)acrylate, neopentyl glycol di(meth)acrylate, dineopentyl glycol di(meth)acrylate, dicyclopentanediol di(meth)acrylate, ethylene oxide adduct of bisphenol A di(meth)acrylate, ethylene oxide adduct of bisphenol F di(meth)acrylate, trimethylolpropane tri(meth) acrylate, pentaerythritol tetra(meth)acrylate, ditrimethylolpropane tetra(meth)acrylate, and, dipentaerythritol hexa(meth)acrylate.

Specific examples of the vinyl group-containing compound include styrenes such as styrene, α-methylstyrene, vinyltoluene and divinylbenzene; vinyl esters such as vinyl acetate, vinyl butyrate, N-vinyl formamide, N-vinyl acetamide, N-vinyl-2-pyrrolidone and N-vinyl caprolactam; vinyl ethers such as ethyl vinyl ether and phenyl vinyl ether; allyl compounds such as diallyl phthalate and allyl glycidyl ether; and (meth)acrylamides such as (meth)acrylamide, N,N-dimethyl (meth)acrylamide and (meth)acryloyl morpholine.

The content of active energy-reactive monomer in the curable composition of this invention is preferably 10 parts by mass or above, at the lowest, per 100 parts by mass of the urethane (meth)acrylate oligomer, which is more preferably 15 parts by mass or above, even more preferably 20 parts by mass or above, yet more preferably 25 parts by mass or above, may be 32 parts by mass or above, and even may be 40 parts by mass or above. The content is preferably 300 parts by mass or below, at the highest, per 100 parts by mass of the urethane (meth)acrylate oligomer, which is more preferably 200 parts by mass or below, even more preferably 150 parts by mass or below, yet more preferably 120 parts by mass or below, furthermore preferably 90 parts by mass or below, and still more preferably 70 parts by mass or below.

<Radical Polymerization Initiator>

The radical polymerization initiator usable in this invention is selectable from known radical polymerization initiators. The radical polymerization initiator may properly be selected from photoradical polymerization initiator and heat radical polymerization initiator, depending on types of the active energy to be applied. The photoradical polymerization initiator is preferable in this invention.

Specific examples of the photoradical polymerization initiator include acetophenone, p-anisil, benzil, benzyl dimethyl ketal, benzoin, benzophenone, 2,4,6-trimethylbenzophenone, 2-benzoylbenzoic acid, 4,4'-bis(diethylamino)benzophenone, benzoin methyl ether, benzoin isopropyl ether, benzoin isobutyl ether, benzoin ethyl ether, methylbenzoin formate, 4-benzoyl benzoate, 2,2'-bis(2-chlorophenyl)-4,4', 5,5'-tetraphenyl-1,2'-biimidazole, methyl 2-benzoylbenzoate, 2-(1,3-benzodioxole-5-yl)-4,6-bis(trichloromethyl)-1,3, 5-triazine, 2-benzyl-2-(dimethylamino)-4'-morpholinobutyrophenone, 4,4'-dichlorobenzophenone, 2,2-diethoxyacetophenone, 2,4-diethylthioxanthene-9-one, diphenyl(2,4,6-trimethylbenzoyl)phosphine oxide, 1,4-dibenzoylbenzene, 2-ethylanthraquinone, t-butylanthraquinone, 1-hydroxycyclohexyl phenyl ketone, 2-hydroxy-2-methylpropiophenone, 2-hydroxy-4'-(2-hydroxyethoxy)-2-methylpropiophenone, 2-methyl-4'-(methylthio)-2-morpholinopropiophenone, 2-isonitrosopropiophenone, 4-phenylbenzophenone, 2-phenyl-2-(p-toluenesulfonyloxy) acetophenone, phenylbis(2,4,6-trimethylbenzoyl)phosphine oxide, thioxanthone, diethylthioxanthone, isopropylthioxanthone and chlorothioxanthone.

Only one type of radical polymerization initiator may be used, or two or more types of radical polymerization initiators may be used in a combined manner. When two or more types of photoradical polymerization initiators are used, the maximum absorption wavelengths may be same or different. The content of the radical polymerization initiator is preferably 0.1 to 10% by mass of the whole amount of curable composition, and is more preferably 0.5 to 5% by mass.

<Other Additives>

The curable composition of this invention may be mixed with other additives, without adversely affecting properties of the curable composition. Such other additives are exemplified by sensitizer, colorant such as pigment and dye, polymerization inhibitor, defoaming agent, coupling agent, and organic and inorganic fillers.

<Physical Properties of Curable Composition>

The curable composition of this invention, when formed according to the description later in EXAMPLES, preferably has a tensile strength at break of 5.00 N/mm$^2$ or above, which is more preferably 7.00 N/mm$^2$ or above, and even more preferably 8.00 N/mm$^2$ or above. Although the upper limit of tensile strength at break is not specifically limited, a level of 10.00 N/mm$^2$ or below may be good enough for practical use.

The curable composition of this invention, when formed according to the description later in EXAMPLES, preferably has an elongation at break of 50% or larger, which is more preferably 70% or larger, and even more preferably 80% or larger. Although the upper limit of elongation at break is not specifically limited, a level of 130% or below may be good enough for practical use.

Cured Article

This invention discloses a cured article obtained by curing the curable composition of this invention. The cured article of this invention is obtainable, for example, by applying the curable composition onto a substrate, and then by applying the active energy. Application of active energy is exemplified by irradiation of active energy ray such as ultraviolet radiation, and provision of heat energy (heating).

The cured article of this invention typically has a flat form such as film, sheet or membrane, but may of course have other forms. Thickness of the cured article of this invention, with a flat form, may be determined depending on applications, which is 0.1 mm to 5 mm for example.

Method for Manufacturing Cured Article

The method for manufacturing a cured article of this invention includes applying the curable composition of this invention onto a substrate, and applying active energy.

Means for applying the curable composition onto the substrate is exemplified by coating, and casting into a frame mold.

The substrate is exemplified by, but not specifically limited to, polycarbonate substrate, polyethylene substrate, polypropylene substrate, polyethylene naphthalate substrate, polymethyl methacrylate substrate, polystyrene substrate, and polyethylene terephthalate substrate. The substrate may have a flat form, or may have a curved face or corners.

The active energy is synonymous to the active energy described above in relation to the curable composition. The same will apply to the preferred ranges.

For the case of UV irradiation, the amount of application of active energy is preferably 500 to 1000 mJ/cm$^2$.

EXAMPLES

This invention will more specifically be explained below referring to Examples. Materials, amounts of consumption, ratios, details of processes, and procedures of processes may suitably be modified without departing from the spirit of this invention. The scope of this invention is, therefore, by no means limited to the specific Examples below. The individual tests were carried out at 25° C., unless otherwise specifically noted.

Dineopentyl glycol (diNPG) represented by formula (3) below was synthesized referring to WO2014/104341. 1,6-Hexanediol (1,6-HD) was obtained from Wako Pure Chemical Corporation.

(3)

Dineopentyl glycolpolycarbonatediols (diNPG-PCD, a product with Mn=1020, and, a product with Mn=1520) represented by formula (4); dineopentyl glycol-1,6-hexanediol-copolymerized polycarbonate diol (diNPG-1,6-HD-PCD, a product with Mn=1180) represented by formula (5); and, 1,6-hexanediol polycarbonate diols (1,6-HD-PCD, a product with Mn=1150, and, a product with Mn=1970) represented by formula (6) were synthesized referring to WO2016/002873.

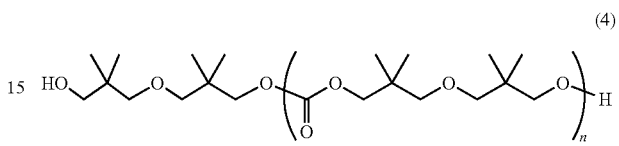
(4)

(In the formula, n represents a number from 1 to 25.)

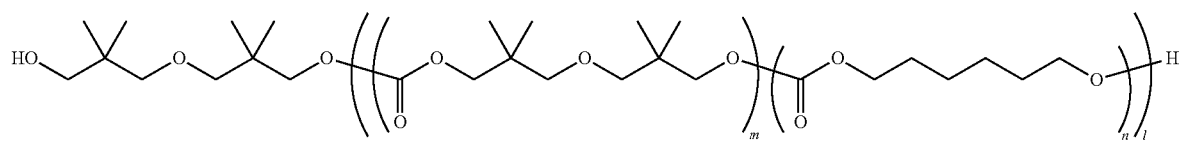
(5)

(In the formula, 1 represents a number from 1 to 10, m represents a number from 1 to 20, and n represents a number from 1 to 20.)

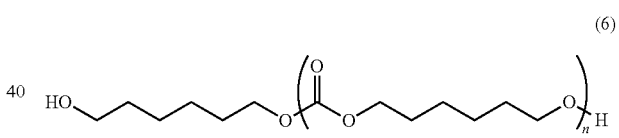
(6)

(In the formula, n represents a number from 1 to 35.)

The number-average molecular weight (Mn) of the polycarbonate diol used in this invention was determined by proton nuclear magnetic resonance using a nuclear magnetic resonance apparatus, in deuterated chloroform solvent, based on integral values of a signal assignable to methylene proton next to the molecular terminal, and a signal assignable to methylene proton next to the carbonate bond.

The nuclear magnetic resonance apparatus employed here was Model JNM-ECA500, from JEOL Ltd.

The end point of synthetic reaction of urethane (meth) acrylate was determined using a Fourier-Transform infrared spectrophotometer (FT-IR), based on a point where a characteristic peak assignable to isocyanate disappeared.

The Fourier-transform infrared spectrophotometer employed here was Nicolet 6700, from Thermo Scientific Inc.

Tolylene diisocyanate: a mixture of approx. 80% by mass of 2,4-tolylene diisocyanate and approx. 20% by mass of 2,6-tolylene diisocyanate, from Tokyo Chemical Industry Co., Ltd.

Trimethyl hexamethylene diisocyanate: product code T1176, a mixture of 2,2,4-trimethyl hexamethylene diisocyanate and 2,4,4-trimethyl hexamethylene diisocyanate, from Tokyo Chemical Industry Co., Ltd.

4-Hydroxybutyl acrylate: from Tokyo Chemical Industry Co., Ltd. Phenoxyethyl acrylate: from Tokyo Chemical Industry Co., Ltd.

Tetrahydrofurfuryl acrylate: from Tokyo Chemical Industry Co., Ltd.

1-Hydroxycyclohexyl phenyl ketone: from Wako Pure Chemical Corporation

2-Methyl-4'-(methylthio)-2-morpholinopropiophenone: from Tokyo Chemical Industry Co., Ltd.

The number-average molecular weight (Mn) of urethane (meth)acrylate in this invention was determined by gel permeation chromatography (GPC). Employed were Hitachi LaChrom ELITE as an apparatus, TOSOH TSKgel GMH$_{HR}$-M as a separation column, tetrahydrofuran as a solvent, and RI Detector as a detector. The analytical curve was prepared using standard polystyrene preparations.

Curing of curable composition: Conveyor-driven ultraviolet (UV) irradiation apparatus CSOT-400, from GS Yuasa Corporation, was used. UV dose was measured using accumulated UV meter UIT-250, from USHIO Inc.

Tensile test: Autograph AG-Xplus, from Shimadzu Corporation was used.

Measurement of YI value and Haze: SH7000, from Nippon Denshoku Industries Co., Ltd. was used.

Example 1

Synthesis of diNPG-PCD Skeleton-Containing Urethane Acrylate (UA1)

A mechanical stirrer was attached to a 500 mL separable flask, and dry air was fed. Tolylene diisocyanate (45.75 g) and dibutyltin dilaurate (39.3 mg) were placed, the content was heated to 70° C., and then stirred. diNPG-PCD (Mn=1020, 153.3 g) represented by formula (4) was added over one hour, the content was heated to 80° C., and stirred for 3 hours. p-Methoxyphenol (45.3 mg) was added, 4-hydroxybutyl acrylate (33.15 g) was then added, and the content was stirred for 3 hours. Disappearance of isocyanate peak in FT-IR spectrum was confirmed. Yield of diNPG-PCD skeleton-containing urethane acrylate (UA1) was 228.0 g. The number-average molecular weight was found to be 2650. Value of (structural unit derived from polyisocyanate):(structural unit derived from polycarbonate diol):(hydroxy group-containing (meth)acrylate-derived group) in the urethane acrylate (mole ratio) was found to be 1.75:1.0:1.5.

(In the formula, m and n represent positive numbers, individually as m=1 to 10, and n=1 to 25.)

Example 2

Synthesis of diNPG-PCD Skeleton-Containing Urethane Acrylate (UA2)

A mechanical stirrer was attached to a 500 mL separable flask, and dry air was fed. Tolylene diisocyanate (21.36 g) and dibutyltin dilaurate (29.5 mg) were place, the content was heated to 70° C., and stirred. diNPG-PCD (Mn=1520, 106.7 g) represented by formula (4) was added over one hour, the content was heated to 80° C., and stirred for 3 hours. p-Methoxyphenol (28.4 mg) was added, 4-hydroxybutyl acrylate (15.14 g) was then added, and the content was stirred for 3 hours. Disappearance of isocyanate peak in FT-IR spectrum was confirmed. Yield of diNPG-PCD skeleton-containing urethane acrylate (UA2) was 141.8 g. The number-average molecular weight was found to be 3690. Value of (structural unit derived from polyisocyanate):(structural unit derived from polycarbonate diol):(hydroxy group-containing (meth)acrylate-derived group) in the urethane acrylate (mole ratio) was found to be 1.75:1.0:1.5.

(7)

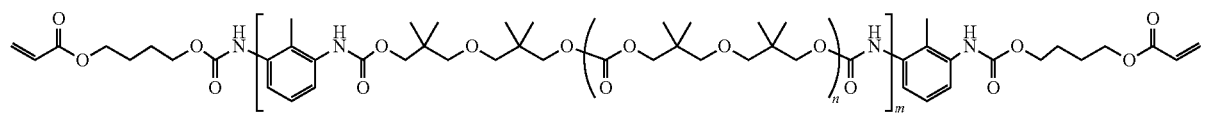

(In the formula, m and n represent positive numbers, individually as m=1 to 10, and n=1 to 25.)

Example 3

Synthesis of diNPG-PCD Skeleton-Containing Urethane Acrylate (UA3)

A mechanical stirrer was attached to a 500 mL separable flask, and dry air was fed. Trimethyl hexamethylene diisocyanate (36.80 g) and dibutyltin dilaurate (27.4 mg) were placed, the content was heated to 70° C., and stirred. diNPG-PCD (Mn=1020, 102.5 g) represented by formula (4) was added over one hour, and the content was stirred thereafter for 3 hours. p-Methoxyphenol (32.2 mg) was added, 4-hydroxybutyl acrylate (21.82 g) was then added, and the content was stirred for 3 hours. Disappearance of isocyanate peak in FT-IR spectrum was confirmed. Yield of diNPG-PCD skeleton-containing urethane acrylate (UA3) was 158.7 g. The number-average molecular weight was found to be 3140. Value of (structural unit derived from polyisocyanate):(structural unit derived from polycarbonate diol):(hydroxy group-containing (meth)acrylate-derived group) in the urethane acrylate (mole ratio was found to be 1.74:1.0:1.5

(7)

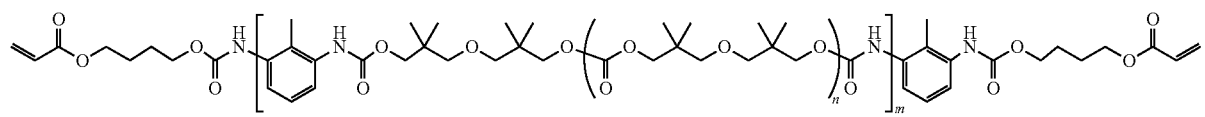

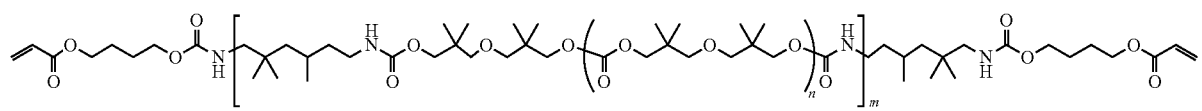

(8)

(In the formula, m and n represent positive numbers, individually as m=1 to 10, and n=1 to 25.)

Example 4

Synthesis of diNPG-1,6-HD-PCD Skeleton-Containing Urethane Acrylate (UA4)

The reaction was allowed to proceed in the same way as in Example 1, except that dineopentyl glycol-1,6-hexanediol-copolymerized polycarbonate diol (diNPG-1,6-HD-PCD, mole ratio of copolymerization=1:1, Mn=1180) was used in place of diNPG-PCD (Mn=1020), to obtain diNPG-1,6-HD-PCD skeleton-containing urethane acrylate (UA4). The number-average molecular weight was found to be 3210. Value of (structural unit derived from polyisocyanate):(structural unit derived from polycarbonate diol):(hydroxy group-containing (meth)acrylate-derived group) in the urethane acrylate (mole ratio) was found to be 1.75:1.0:1.5.

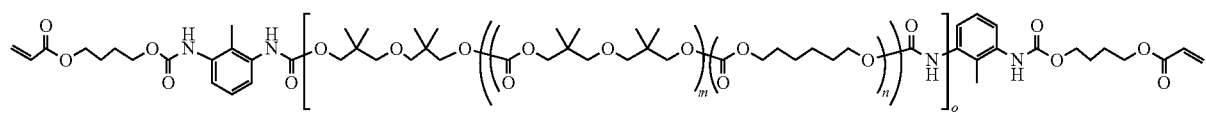

(9)

(In the formula, l, m, n and o represent positive numbers, individually as l=1 to 10, m=1 to 20, n=1 to 20, and o=1 to 10.)

Comparative Example 1

Synthesis of 1,6-HD-PCD Skeleton-Containing Urethane Acrylate (UA5)

The reaction was allowed to proceed in the same way as in Example 1, except that 1,6-HD-PCD (Mn=1150) was used in place of diNPG-PCD (Mn=1020), to obtain 1,6-HD-PCD skeleton-containing urethane acrylate (UA5). The number-average molecular weight was found to be 3200. Value of (structural unit derived from polyisocyanate):(structural unit derived from polycarbonate diol):(hydroxy group-containing (meth)acrylate-derived group) in the urethane acrylate (mole ratio), was found to be 1.75:1.0:1.5.

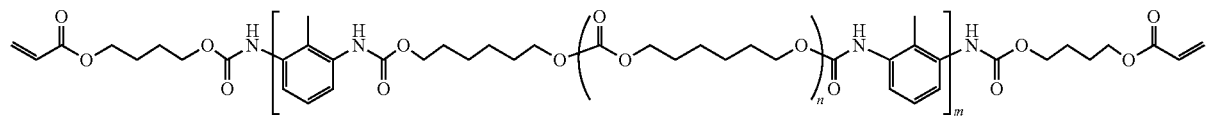

(10)

(In the formula, m and n represent positive numbers, individually as m=1 to 10, and n=1 to 35.)

Comparative Example 2

Synthesis of 1,6-HD-PCD Skeleton-Containing Urethane Acrylate (UA6)

The reaction was allowed to proceed in the same way as in Example 2, except that 1,6-HD-PCD (Mn=1970) was used in place of diNPG-PCD (Mn=1520), to obtain 1,6-HD-PCD skeleton-containing urethane acrylate (UA6). The number-average molecular weight was found to be 5100. Value of (structural unit derived from polyisocyanate):(structural unit derived from polycarbonate diol):(hydroxy group-containing (meth)acrylate-derived group) in the urethane acrylate (mole ratio) was found to be 1.75:1.0:1.5.

Example 6

Preparation of Curable Composition 2

To 100 parts by mass of diNPG-PCD skeleton-containing urethane acrylate (UA1) synthesized in Example 1, added was 50 parts by mass of phenoxyethyl acrylate, and the content was stirred under heating in an oil bath at 70° C. Thereafter, 3.75 parts by mass of 1-hydroxycyclohexyl phenyl ketone and 0.75 parts by mass of 2-methyl-4'-(methylthio)-2-morpholinopropiophenone were added, the content was thoroughly stirred, and degassed or defoamed under reduced pressure, to prepare curable composition 2.

Example 7

Preparation of Curable Composition 3

To 100 parts by mass of diNPG-PCD skeleton-containing urethane acrylate (UA1) synthesized in Example 1, added (10)

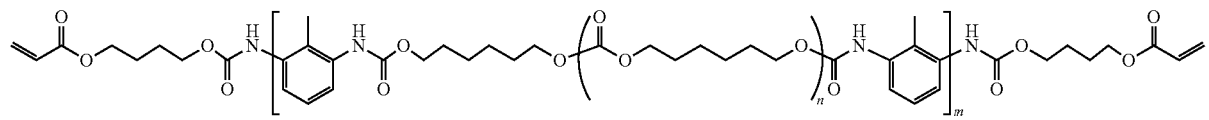

(In the formula, m and n represent positive numbers, individually as m=1 to 10, and n=1 to 35.)

Comparative Example 3

Synthesis of 1,6-HD-PCD Skeleton-Containing Urethane Acrylate (UA7)

The reaction was allowed to proceed in the same way as in Example 3, except that 1,6-HD-PCD (Mn=1150) was used in place of diNPG-PCD (Mn=1020), to obtain 1,6-HD-PCD skeleton-containing urethane acrylate (UA7). The number-average molecular weight was found to be 3850. Value of (structural unit derived from polyisocyanate):(structural unit derived from polycarbonate diol):(hydroxy group-containing (meth)acrylate-derived group) in the urethane acrylate (mole ratio) was found to be 1.74:1.0:1.5.

was 100 parts by mass of phenoxyethyl acrylate, and the content was stirred under heating in an oil bath at 70° C. Thereafter, 5.0 parts by mass of 1-hydroxycyclohexyl phenyl ketone and 1.0 parts by mass of 2-methyl-4'-(methylthio)-2-morpholinopropiophenone were added, the content was thoroughly stirred, and degassed or defoamed under reduced pressure, to prepare curable composition 3.

Example 8

Preparation of Curable Composition 4

To 100 parts by mass of diNPG-PCD skeleton-containing urethane acrylate (UA1) synthesized in Example 1, added was 50 parts by mass of tetrahydrofurfuryl acrylate, and the content was stirred under heating in an oil bath at 70° C. Thereafter, 3.75 parts by mass of 1-hydroxycyclohexyl (11)

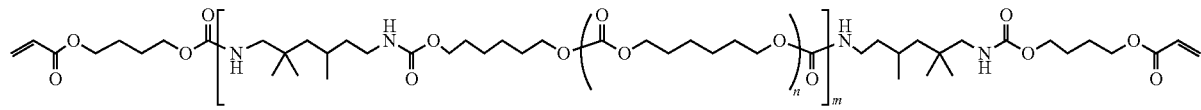

(In the formula, m and n represent positive numbers, individually as m=1 to 10, and n=1 to 35.)

Example 5

Preparation of Curable Composition 1

To 100 parts by mass of diNPG-PCD skeleton-containing urethane acrylate (UA1) synthesized in Example 1, added was 30 parts by mass of phenoxyethyl acrylate, and the content was stirred under heating in an oil bath at 70° C. Thereafter, 3.25 parts by mass of 1-hydroxycyclohexyl phenyl ketone and 0.65 parts by mass of 2-methyl-4'-(methylthio)-2-morpholinopropiophenone were added, the content was thoroughly stirred, and degassed or defoamed under reduced pressure, to prepare curable composition 1.

phenyl ketone and 0.75 parts by mass of 2-methyl-4'-(methylthio)-2-morpholinopropiophenone were added, the content was thoroughly stirred, and degassed or defoamed under reduced pressure, to prepare curable composition 4.

Example 9

Preparation of Curable Composition 5

To 100 parts by mass of diNPG-PCD skeleton-containing urethane acrylate (UA2) synthesized in Example 2, added was 30 parts by mass of phenoxyethyl acrylate, and the content was stirred under heating in an oil bath at 70° C. Thereafter, 3.25 parts by mass of 1-hydroxycyclohexyl phenyl ketone and 0.65 parts by mass of 2-methyl-4'-(methylthio)-2-morpholinopropiophenone were added, the content was thoroughly stirred, and degassed or defoamed under reduced pressure, to prepare curable composition 5.

Example 10

Preparation of Curable Composition 6

To 100 parts by mass of diNPG-PCD skeleton-containing urethane acrylate (UA3) synthetized in Example 3, added was 50 parts by mass of phenoxyethyl acrylate, and the content was stirred under heating in an oil bath at 70° C. Thereafter, 3.75 parts by mass of 1-hydroxycyclohexyl phenyl ketone and 0.75 parts by mass of 2-methyl-4'-(methylthio)-2-morpholinopropiophenone were added, the content was thoroughly stirred, and degassed or defoamed under reduced pressure, to prepare curable composition 6.

Example 11

Preparation of Curable Composition 7

To 100 parts by mass of diNPG-1,6-HD-PCD skeleton-containing urethane acrylate (UA4) synthesized in Example 4, added was 50 parts by mass of phenoxyethyl acrylate, and the content was stirred under heating on an oil bath at 70° C. Thereafter, 3.75 parts by mass of 1-hydroxycyclohexyl phenyl ketone and 0.75 parts by mass of 2-methyl-4'-(methylthio)-2-morpholinopropiophenone were added, the content was thoroughly stirred, and degassed or defoamed under reduced pressure, to prepare curable composition 7.

Comparative Example 4

Preparation of Curable Composition 8

Curable composition 8 was prepared in the same way as in Example 5, except that 1,6-HD-PCD skeleton-containing urethane acrylate (UA5) synthesized in Comparative Example 1 was used in place of diNPG-PCD skeleton-containing urethane acrylate (UA1).

Comparative Example 5

Preparation of Curable Composition 9

Curable composition 9 was prepared in the same way as in Example 6, except that 1,6-HD-PCD skeleton-containing urethane acrylate (UA5) synthesized in Comparative Example 1 was used in place of diNPG-PCD skeleton-containing urethane acrylate (UA1) in Example 6.

Comparative Example 6

Preparation of Curable Composition 10

Curable composition 10 was prepared in the same way as in Example 7, except that 1,6-HD-PCD skeleton-containing urethane acrylate (UA5) synthesized in Comparative Example 1 was used in place of diNPG-PCD skeleton-containing urethane acrylate (UA1) in Example 7.

Comparative Example 7

Preparation of Curable Composition 11

Curable composition 11 was prepared in the same way as in Example 8, except that 1,6-HD-PCD skeleton-containing urethane acrylate (UA5) synthesized in Comparative Example 1 was used in place of diNPG-PCD skeleton-containing urethane acrylate (UA1) in Example 8.

Comparative Example 8

Preparation of Curable Composition 12

Curable composition 12 was prepared in the same way as in Example 9, except that 1,6-HD-PCD skeleton-containing urethane acrylate (UA6) synthesized in Comparative Example 2 was used in place of diNPG-PCD skeleton-containing urethane acrylate (UA2) in Example 9.

Comparative Example 9

Preparation of Curable Composition 13

Curable composition 13 was prepared in the same way as in Example 10, except that 1,6-HD-PCD skeleton-containing urethane acrylate (UA7) synthesized in Comparative Example 3 was used in place of diNPG-PCD skeleton-containing urethane acrylate (UA3) in Example 10.

Manufacture of Cured Article

Polyethylene terephthalate film (PET film) was placed on a glass plate, a 110 mm×110 mm×0.5 mm frame mold made of rubber was placed thereon, curable composition 1 heated to 70° C. was cast therein, PET film was placed thereon so as not to catch bubbles in between, a glass plate was placed further thereon, and the stack was clamped with clips so as to make it to a thickness of 0.5 mm. Ultraviolet radiation of 400 mJ/cm$^2$ was irradiated on the stack through the glass plate, the glass plate was then removed, and ultraviolet radiation of 400 mJ/cm$^2$ was irradiated again through the PET film to manufacture a cured article. All conducted in the same way for all other curable compositions.

[Tensile Test]

Tensile test was conducted in compliance with JIS K 6251:2010. Each of the above obtained cured articles was treated at 120° C. for two hours, punched out using a dumbbell type-3 punching blade, the punched out piece was allowed to standstill at 23±2° C. for 24 hours, and then pulled at a tensile speed of 10 mm/min to measure tensile strength at break (N/mm$^2$) and elongation at break (%). Results were summarized in Table 1 (Examples 12 to 18, Comparative Examples 10 to 15).

[Heat Resistance Test]

Each of the above obtained cured articles was measured regarding YI value (initial YI value) in the thickness direction of each test piece (over a thickness of 0.5 mm), then placed in a thermostat chamber conditioned at 120° C., taken out 144 hours after, and measured again regarding YI value (post-heating YI value) in the thickness direction of the test piece (over a thickness of 0.5 mm). Both YI values were individually determined by averaging measured values obtained from three test pieces per cured article. Difference between the initial YI value and the post-heating YI value was given as ΔYI value. Results were summarized in Table 2 (Examples 19 to 22, Comparative Examples 16 to 19).

[Antifouling Test]

Each of the above obtained cured articles was measured regarding haze (initial haze) in the thickness direction of each test piece (over a thickness of 0.5 mm), then placed in a vial prefilled with silica gel, and the vial was shaken by hand for one minute. The test piece was taken out from the vial, lightly wiped with a paper towel three times, and measured regarding haze (post-triple wiping haze) in the thickness direction of the test piece (over a thickness of 0.5 mm). Difference between the initial haze and the post-triple wiping haze was given as ΔHaze, based on averaging of measured values obtained from two test pieces. Results are summarize in Table 3 (Examples 23 to 26, Comparative Examples 20 to 23).

TABLE 1

| Curable Composition | Example 12 1 | Example 13 2 | Example 14 3 | Example 15 4 | Example 16 5 | Example 17 6 | Example 18 7 |
|---|---|---|---|---|---|---|---|
| Urethane (Meth) Acrylate (Starting Material of PCD) | | | | | | | |
| UA1(diNPG-PCD Mn1020) | 100 | 100 | 100 | 100 | | | |
| UA2(diNPG-PCD Mn1520) | | | | | 100 | | |
| UA3(diNPG-PCD Mn1020) | | | | | | 100 | |
| UA4(diNPG-1,6-HD-PCD Mn1180) | | | | | | | 100 |
| UA5(1,6-HD-PCD Mn1150) | | | | | | | |
| UA6(1,6-HD-PCD Mn1970) | | | | | | | |
| UA7(1,6-HD-PCD Mn1150) | | | | | | | |
| (Meth) Acrylate | | | | | | | |
| Phenoxyethyl Acrylate | 30 | 50 | 100 | | 30 | 50 | 50 |
| Tetrahydrofurfuryl Acrylate | | | | 50 | | | |
| Radical Polymerization Initiator | | | | | | | |
| 1-Hydroxycyclohel Phenyl Ketone | 3.25 | 3.75 | 5.0 | 3.75 | 3.25 | 3.75 | 3.75 |
| 2-Methyl-4'-(Methylthio)-2-Morpholinopropiophenone | 0.65 | 0.75 | 1.0 | 0.75 | 0.65 | 0.75 | 0.75 |
| Tensile Test | | | | | | | |
| Strength at Break (N/mm$^2$) | 8.11 | 8.89 | 5.76 | 5.39 | 5.59 | 1.89 | 5.15 |
| Elongation at Break (%) | 89.6 | 102.4 | 113.9 | 57.0 | 94.0 | 50.7 | 76.8 |

| Curable Composition | Comparative Example 10 8 | Comparative Example 11 9 | Comparative Example 12 10 | Comparative Example 13 11 | Comparative Example 14 12 | Comparative Example 15 13 |
|---|---|---|---|---|---|---|
| Urethane (Meth) Acrylate (Starting Material of PCD) | | | | | | |
| UA1(diNPG-PCD Mn1020) | | | | | | |
| UA2(diNPG-PCD Mn1520) | | | | | | |
| UA3(diNPG-PCD Mn1020) | | | | | | |
| UA4(diNPG-1,6-HD-PCD Mn1180) | | | | | | |
| UA5(1,6-HD-PCD Mn1150) | 100 | 100 | 100 | 100 | | |
| UA6(1,6-HD-PCD Mn1970) | | | | | 100 | |
| UA7(1,6-HD-PCD Mn1150) | | | | | | 100 |
| (Meth) Acrylate | | | | | | |
| Phenoxyethyl Acrylate | 30 | 50 | 100 | | 30 | 50 |
| Telrahydrofurfuryl Acrylate | | | | 50 | | |
| Radical Polymerization Initiator | | | | | | |
| 1-Hydroxycyclohexyl Phenyl Ketone | 3.25 | 3.75 | 5.0 | 3.75 | 3.25 | 3.75 |
| 2-Methyl-4'-(Methylthio)-2-Morpholinopropiophenone | 0.65 | 0.75 | 1.0 | 0.75 | 0.65 | 0.75 |
| Tensile Test | | | | | | |
| Strength at Break (N/mm$^2$) | 4.37 | 4.85 | 2.93 | 5.16 | 2.81 | 1.56 |
| Elongation at Break (%) | 50.1 | 66.4 | 61.0 | 46.9 | 59.4 | 26.5 |

The ingredients of the curable compositions summarized in Table 1 are given in ratio by mass (same will apply to Table 2 and Table 3 below). Results of the tensile test were summarized in Table 1.

From comparison between Example 12 and Comparative Example 10, it was found that, when diNPG-PCD skeleton-containing urethane (meth)acrylate was used, the strength at break became higher, and also the elongation at break became larger, as compared with the case where the conventionally known 1,6-HD-PCD skeleton-containing urethane (meth)acrylate was used.

In all cases where the amount of mixing of phenoxyethyl acrylate, which is a (meth)acrylate compound, was 30 parts by mass per 100 parts by mass of urethane (meth)acrylate (Example 12 and Comparative Example 10), 50 parts by mass (Example 13 and Comparative Example 11), and 100 parts by mass (Example 14 and Comparative Example 12), it was also found that both of the strength at break and the elongation at break were improved when diNPG-PCD skeleton-containing urethane (meth)acrylate was used, as compared with the case where 1,6-HD-PCD skeleton-containing urethane (meth)acrylate was used.

From comparison between Example 15 and Comparative Example 13, it was also found that the aforementioned superiorities were observed when an ordinary (meth)acrylate, such as tetrahydrofurfuryl acrylate, was used as the (meth)acrylate compound.

From comparison among Example 16, Comparative Example 10 and Comparative Example 14, it was found that, by using a diNPG-PCD skeleton-containing urethane (meth)acrylate, both of the strength at break and the elongation were improved, irrespective of the number-average molecular weight of the polycarbonate diol, as compared with the cases where 1,6-HD-PCD skeleton-containing urethane (meth)acrylates were used.

From comparison between Example 17 and Comparative Example 15, it was found that superiority of diNPG-PCD skeleton-containing urethane (meth)acrylate remained unchanged, even if the diisocyanate to be used was switched from an aromatic diisocyanate to an aliphatic diisocyanate.

From comparison among Example 13, Example 18 and Comparative Example 11, it was found that, when PCDs having the diNPG skeleton and the 1,6-HD skeleton were used, both of the strength at break and the elongation were improved, as compared with the case where PCD having the 1,6-HD skeleton only was used. In other words, it was found that the strength at break and the elongation were improved, also when the diNPG skeleton is partially contained in the urethane (meth)acrylate skeleton.

As has been described above, the urethane (meth)acrylates derived from PCDs having the diNPG-PCD skeletons were found to give the cured articles that excel in the strength and elongation.

TABLE 2

| Curable Composition | Example 19 1 | Example 20 3 | Example 21 4 | Example 22 5 | Comparative Example 16 8 | Comparative Example 17 10 | Comparative Example 18 11 | Comparative Example 19 12 |
|---|---|---|---|---|---|---|---|---|
| Urethane (Meth) Acrylate (Starting Material of PCD) | | | | | | | | |
| UA1(diNPG-PCD Mn1020) | 100 | 100 | 100 | | | | | |
| UA2(diNPG-PCD Mn1520) | | | | 100 | | | | |
| UA5(1,6-HD-PCD Mn1150) | | | | | 100 | 100 | 100 | |
| UA6(1,6-HD-PCD Mn1970) | | | | | | | | 100 |
| (Meth) Acrylate | | | | | | | | |
| Phenoxyethyl Acrylate | 30 | 100 | | 30 | 30 | 100 | | 30 |
| Tetrahydrofurfuryl Acrylate | | | 50 | | | | 50 | |
| Radical Polymerization Initiator | | | | | | | | |
| 1-Hydroxycyclohexyl Phenyl Ketone | 3.25 | 5.0 | 3.75 | 3.25 | 3.25 | 5.0 | 3.75 | 3.25 |
| 2-Methyl-4'-(Methylthio)-2-Morpholinopropiophenone | 0.65 | 1.0 | 0.75 | 0.65 | 0.65 | 1.0 | 0.75 | 0.65 |
| Heat Resistance Test | | | | | | | | |
| Initial YI value | 2.2 | 3.3 | 2.3 | 2.5 | 3.7 | 4.2 | 2.6 | 3.7 |
| YI Value After Heated at 120° C. for 144 Hours | 18.0 | 18.4 | 28.4 | 19.1 | 27.0 | 26.9 | 40.6 | 44.0 |
| ΔYI Value | 15.8 | 15.1 | 26.1 | 16.6 | 23.3 | 22.7 | 38.0 | 40.3 |

Results of heat resistance test were summarized in Table 2. From comparisons between Example 19 and Comparative Example 16, between Example 20 and Comparative Example 17, between Example 21 and Comparative Example 18, and between Example 22 and Comparative Example 19, it was found that all Comparative Examples showed larger YI values after heated at 120° C. for 144 hours, despite that the initial YI values were almost same. From these results, the urethane (meth)acrylates derived from PCDs having the diNPC-PCD skeletons were found to be less likely to yellow under heating, proving excellent heat resistance, as compared with the conventionally known urethane (meth)acrylates derived from PCDs having the 1,6-HD-PCD skeletons.

TABLE 3

| Curable Composition | Example 23 1 | Example 24 3 | Example 25 4 | Example 26 5 | Comparative Example 20 8 | Comparative Example 21 10 | Comparative Example 22 11 | Comparative Example 23 12 |
|---|---|---|---|---|---|---|---|---|
| Urethane (Meth) Acrylate (Starting Material of PCD) | | | | | | | | |
| UA1(diNPG-PCD Mn1020) | 100 | 100 | 100 | | | | | |
| UA2(diNPG-PCD Mn1520) | | | | 100 | | | | |
| UA5(1,6-HD-PCD Mn1150) | | | | | 100 | 100 | 100 | |
| UA6(1,6-HD-PCD Mn1970) | | | | | | | | 100 |
| (Meth) Acrylate | | | | | | | | |
| Phenoxyethyl Acrylate | 30 | 100 | | 30 | 30 | 100 | | 30 |
| Tetrahydrofurfuryl Acrylate | | | 50 | | | | 50 | |
| Radical Polymerization Initiator | | | | | | | | |
| 1-Hydroxycyclohexyl Phenyl Ketone | 3.25 | 5.0 | 3.75 | 3.25 | 3.25 | 5.0 | 3.75 | 3.25 |
| 2-Methyl-4'-(Methylthio)-2-Morpholinopropiophenone | 0.65 | 1.0 | 0.75 | 0.65 | 0.65 | 1.0 | 0.75 | 0.65 |

TABLE 3-continued

| Curable Composition | Example 23 1 | Example 24 3 | Example 25 4 | Example 26 5 | Comparative Example 20 8 | Comparative Example 21 10 | Comparative Example 22 11 | Comparative Example 23 12 |
|---|---|---|---|---|---|---|---|---|
| Antifouling Test | | | | | | | | |
| Initial Haze/% | 4.1 | 13.9 | 7.3 | 4.0 | 3.3 | 8.6 | 5.0 | 12.7 |
| Post-Triple Wiping Haze/% | 11.5 | 20.7 | 8.2 | 22.6 | 51.5 | 58.5 | 67.8 | 82.4 |
| Δhaze/% | 7.4 | 6.8 | 0.9 | 18.6 | 48.2 | 49.9 | 62.8 | 69.7 |

Results of the antifouling test were summarized in Table 3. From comparisons between Example 23 and Comparative Example 20, between Example 24 and Comparative Example 21, between Example 25 and Comparative Example 22, and between Example 26 and Comparative Example 23, it was found that there were no considerable differences in the initial haze between the cured articles obtained from the diNPG-PCD skeleton-containing urethane (meth)acrylates, and the cured articles obtained from the 1,6-HD-PCD skeleton-containing urethane (meth)acrylates. After treated with silica gel and wiped with a paper towel three times, the cured articles obtained from the diNPG-PCD skeleton-containing urethane (meth)acrylates hardly showed increased haze. In contrast, the cured articles obtained from the 1,6-HD-PCD skeleton-containing urethane (meth)acrylates were found to show considerably increased haze that exceeds 50%. This demonstrates a large superiority of the cured articles obtained from PCDs having the diNPG skeletons, in terms of the antifouling property.

INDUSTRIAL APPLICABILITY

The urethane (meth)acrylate of this invention, after being cured, excels in the tensile strength at break and the elongation at break, and also excellent properties such as heat resistance and antifouling property, so that this is considered to be useful in a wide variety of fields including optical component, optical coating material, adhesive, electronic and electric materials, package, and decorative film.

The invention claimed is:

1. A urethane (meth)acrylate, comprising:
   a structural unit derived from a polycarbonate diol;
   a structural unit derived from a polyisocyanate; and
   a hydroxy group-containing (meth)acrylate-derived group,
   wherein the polycarbonate diol includes at least one carbonate structural unit of formula (1),

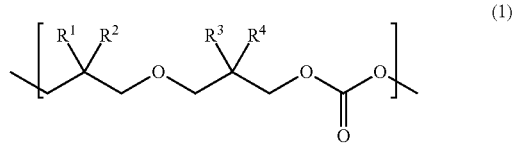

(1)

where each of $R^1$, $R^2$, $R^3$ and $R^4$ independently represents an aliphatic hydrocarbon group having 1 to 6 carbon atoms such that the carbonate structural unit of the formula (1) accounts for 100 mol % of a carbonate structural unit or units in the polycarbonate diol.

2. The urethane (meth)acrylate of claim 1, wherein in the formula (1), a combination of $R^1$ and $R^2$, and a combination of $R^3$ and $R^4$, are different from each other.

3. The urethane (meth)acrylate of claim 1, wherein in the formula (1), each of $R^1$ and $R^2$ represents a methyl group.

4. The urethane (meth)acrylate of claim 1, wherein in the formula (1), each of $R^1$, $R^2$, $R^3$ and $R^4$ represents a methyl group.

5. The urethane (meth)acrylate of claim 1, wherein the polycarbonate diol has a number-average molecular weight of 400 to 5000.

6. The urethane (meth)acrylate of claim 1, wherein the polyisocyanate is a diisocyanate.

7. The urethane (meth)acrylate of claim 1, wherein the hydroxy group-containing (meth)acrylate has one hydroxy group in one molecule.

8. The urethane (meth)acrylate of claim 1, wherein the hydroxy group-containing (meth)acrylate is a monofunctional (meth)acrylate.

9. A method for manufacturing a urethane (meth)acrylate, comprising:
   reacting a polyisocyanate with a polycarbonate diol that includes at least one carbonate structural unit of formula (1),

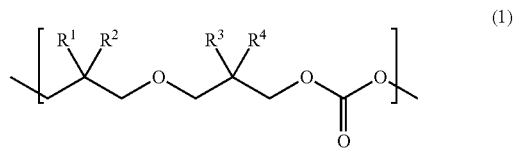

(1)

where each of $R^1$, $R^2$, $R^3$ and $R^4$ independently represents an aliphatic hydrocarbon group having 1 to 6 carbon atoms such that the carbonate structural unit of the formula (1) accounts for 100 mol % of a carbonate structural unit or units in the polycarbonate diol; and
   reacting a hydroxy group-containing (meth)acrylate with a product obtained by reacting the polyisocyanate and the polycarbonate diol such that a urethane (meth)acrylate comprising a structural unit derived from the polycarbonate diol, a structural unit derived from the polyisocyanate, and a hydroxy group-containing (meth)acrylate-derived group is obtained.

10. A method for manufacturing the urethane (meth)acrylate of claim 1, comprising:
    reacting the polycarbonate diol, the polyisocyanate, and the hydroxy group-containing (meth)acrylate.

11. A curable composition, comprising:
    the urethane (meth)acrylate of claim 1.

12. The curable composition of claim 11, further comprising:
    an active energy-reactive monomer; and
    a radical polymerization initiator.

13. The curable composition of claim 12, wherein the active energy-reactive monomer is included in an amount of 10 to 300 parts by mass per 100 parts by mass of the urethane (meth)acrylate.

14. The curable composition of claim 12, wherein the active energy-reactive monomer is a (meth)acrylate compound.

15. A cured article obtained by a process including curing the curable composition of claim 11.

16. A method for manufacturing a cured article, comprising:
- applying the curable composition of claim 11 onto a substrate; and
- applying active energy.

17. The urethane (meth)acrylate of claim 5, wherein the polyisocyanate is a diisocyanate.

18. The urethane (meth)acrylate of claim 6, wherein the hydroxy group-containing (meth)acrylate has one hydroxy group in one molecule.

19. The urethane (meth)acrylate of claim 7, wherein the hydroxy group-containing (meth)acrylate is a monofunctional (meth)acrylate.

20. The urethane (meth)acrylate of claim 1, wherein the polycarbonate dial has a number-average molecular weight of 400 to 5000, the polyisocyanate is a diisocyanate, and the hydroxy group-containing (meth)acrylate has one hydroxy group in one molecule.

* * * * *